US009108654B2

(12) United States Patent
Kozinski

(10) Patent No.: US 9,108,654 B2
(45) Date of Patent: Aug. 18, 2015

(54) INFANT CAR SEAT ASSEMBLY

(71) Applicant: Micheal Kozinski, Valparaiso, IN (US)

(72) Inventor: Micheal Kozinski, Valparaiso, IN (US)

(*) Notice: Subject to any disclaimer, the term of this patent is extended or adjusted under 35 U.S.C. 154(b) by 7 days.

(21) Appl. No.: 13/910,838

(22) Filed: Jun. 5, 2013

(65) Prior Publication Data
US 2014/0151969 A1 Jun. 5, 2014

Related U.S. Application Data

(60) Provisional application No. 61/655,711, filed on Jun. 5, 2012.

(51) Int. Cl.
B62B 1/00 (2006.01)
B62B 7/00 (2006.01)
B60N 2/26 (2006.01)
B60N 2/28 (2006.01)
B62B 7/08 (2006.01)
B62B 7/14 (2006.01)
B62B 9/12 (2006.01)

(52) U.S. Cl.
CPC . B62B 7/006 (2013.01); B60N 2/26 (2013.01); B60N 2/2845 (2013.01); B62B 7/08 (2013.01); B62B 7/142 (2013.01); B62B 7/145 (2013.01); B62B 9/12 (2013.01); B62B 2206/06 (2013.01)

(58) Field of Classification Search
USPC ......... 280/33.993, 47.38, 639–644, 647–650, 280/658
See application file for complete search history.

(56) References Cited

U.S. PATENT DOCUMENTS

| 4,449,732 | A | 5/1984 | Surot |
| 4,872,692 | A | 10/1989 | Steenburg |
| 5,823,547 | A | 10/1998 | Otobe et al. |
| 6,367,821 | B2 | 4/2002 | Thiele |
| 6,446,990 | B1 | 9/2002 | Nania et al. |
| 6,976,685 | B1 | 12/2005 | King et al. |
| 7,658,399 | B2 * | 2/2010 | Van Dijk ................. 280/642 |
| 8,205,906 | B2 * | 6/2012 | Kretschmer et al. ......... 280/642 |
| 8,434,781 | B2 | 5/2013 | Mazar et al. |
| 8,469,389 | B2 | 6/2013 | Mazar et al. |
| 8,469,390 | B2 | 6/2013 | Mazar et al. |
| 8,801,028 | B2 | 8/2014 | Mazar et al. |
| 2012/0032420 | A1 | 2/2012 | Mazar et al. |
| 2012/0086240 | A1 | 4/2012 | Tsai et al. |
| 2012/0119457 | A1 * | 5/2012 | Williams .................. 280/30 |
| 2012/0267875 | A1 | 10/2012 | Mazar et al. |
| 2012/0267877 | A1 | 10/2012 | Mazar et al. |

FOREIGN PATENT DOCUMENTS

EP 1918155 5/2008

* cited by examiner

Primary Examiner — John Walters
Assistant Examiner — James Triggs
(74) Attorney, Agent, or Firm — Hartman Global IP Law; Gary M. Hartman; Michael D. Winter

(57) ABSTRACT

Infant car seat assemblies suitable for functioning as both a car seat and a stroller and capable of functioning with a wide variety of commercially available car seats. The infant car seat assembly for providing mobility to an infant car seat includes at least two hubs, a pair of front legs and a pair of rear legs secured to the hubs at uppermost extents thereof and having at least two wheel assemblies secured to lowermost extents thereof, and at least two adapters configured to releaseably secure the hubs to the infant car seat.

18 Claims, 13 Drawing Sheets

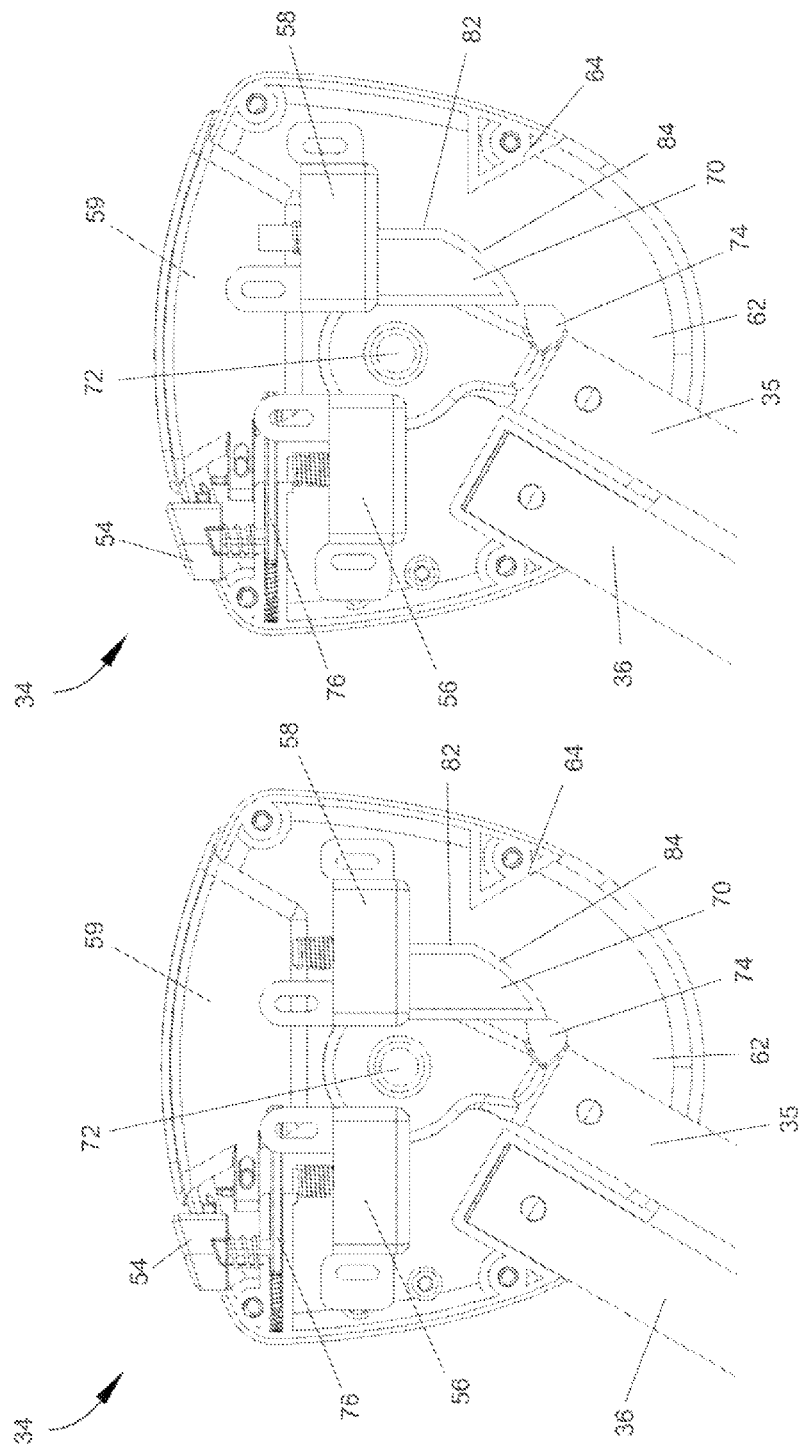

INFANT CAR SEAT ASSEMBLY

CROSS REFERENCE TO RELATED APPLICATIONS

This application claims the benefit of U.S. Provisional Application No. 61/655,711, filed Jun. 5, 2012, the contents of which are incorporated herein by reference.

BACKGROUND OF THE INVENTION

The present invention generally relates to child safety devices. More particularly, this invention relates to infant car seats capable of functioning as strollers.

Child car seats are required by law in every state in the United States. While specific laws regarding age and weight requirements vary from state to state, most states require infants younger than one to be restrained in a rear-facing infant car seat. Children this young are generally unable to walk or stand, and as such are typically carried in a stroller when they are taken out for any extended duration. As a result, parents and care givers of infants, in order to transport their infant, often must first place the infant in an infant car seat while driving, then place them in a stroller upon leaving the car. This creates the need for both a stroller and a car seat, two devices which fill similar but distinct roles.

To address the above, various combination car seat-stroller designs have been proposed. However, such designs can compromise the ability of the device to safely function as a car seat, or may be impractical to use. Other proposed designs include attachments for infant car seats that enable a car seat to function as a stroller. Such devices can be limited for use with specially configured car seats or may need to be removed before the car seat can be replaced in the car.

In view of the above, it can be appreciated that there are certain problems, shortcomings or disadvantages associated with the prior art, and that it would be desirable if an improved infant car seat were available that was capable of functioning as both a car seat and a stroller, and was also capable of functioning with a wide variety of commercially available car seats.

BRIEF DESCRIPTION OF THE INVENTION

The present invention provides infant car seat assemblies suitable for functioning as both a car seat and a stroller and capable of functioning with a wide variety of commercially available car seats.

According to a first aspect of the invention, an infant car seat assembly for providing mobility to an infant car seat includes at least two hubs, a pair of front legs secured to the hubs at uppermost extents thereof and having at least two wheel assemblies secured to lowermost extents thereof, a pair of rear legs secured to the hubs at uppermost extents thereof and having at least two wheel assemblies secured to lowermost extents thereof, and at least two adapters configured to releaseably secure the hubs to the infant car seat.

According to a second aspect of the invention, an infant car seat assembly for providing mobility to an infant car seat includes at least two hubs, a pair of front legs secured to the hubs at uppermost extents thereof and having at least two wheel assemblies secured to lowermost extents thereof, and a pair of rear legs secured to the hubs at uppermost extents thereof and having at least two wheel assemblies secured to lowermost extents thereof. The infant car seat assembly is adapted to secure to the infant car seat and the infant car seat can function in a vehicle without detaching the infant car seat assembly from the infant car seat.

A technical effect of the invention is the ability of an infant car seat assembly to function as both a car seat and a stroller. In particular, it is believed that providing an assembly adapted to be secured to a commercially available car seat allows one to utilize the car seat and the assembly as a stroller.

Other aspects and advantages of this invention will be better appreciated from the following detailed description.

BRIEF DESCRIPTION OF THE DRAWINGS

FIGS. 8-11 represent interior views of hubs of the car seat assembly of FIGS. 1-3 and show legs of the car seat assembly in a locked expanded position, an unlocked partially expanded position, a locked collapsed position, and an unlocked collapsed position, respectively.

DETAILED DESCRIPTION OF THE INVENTION

Figure 1:
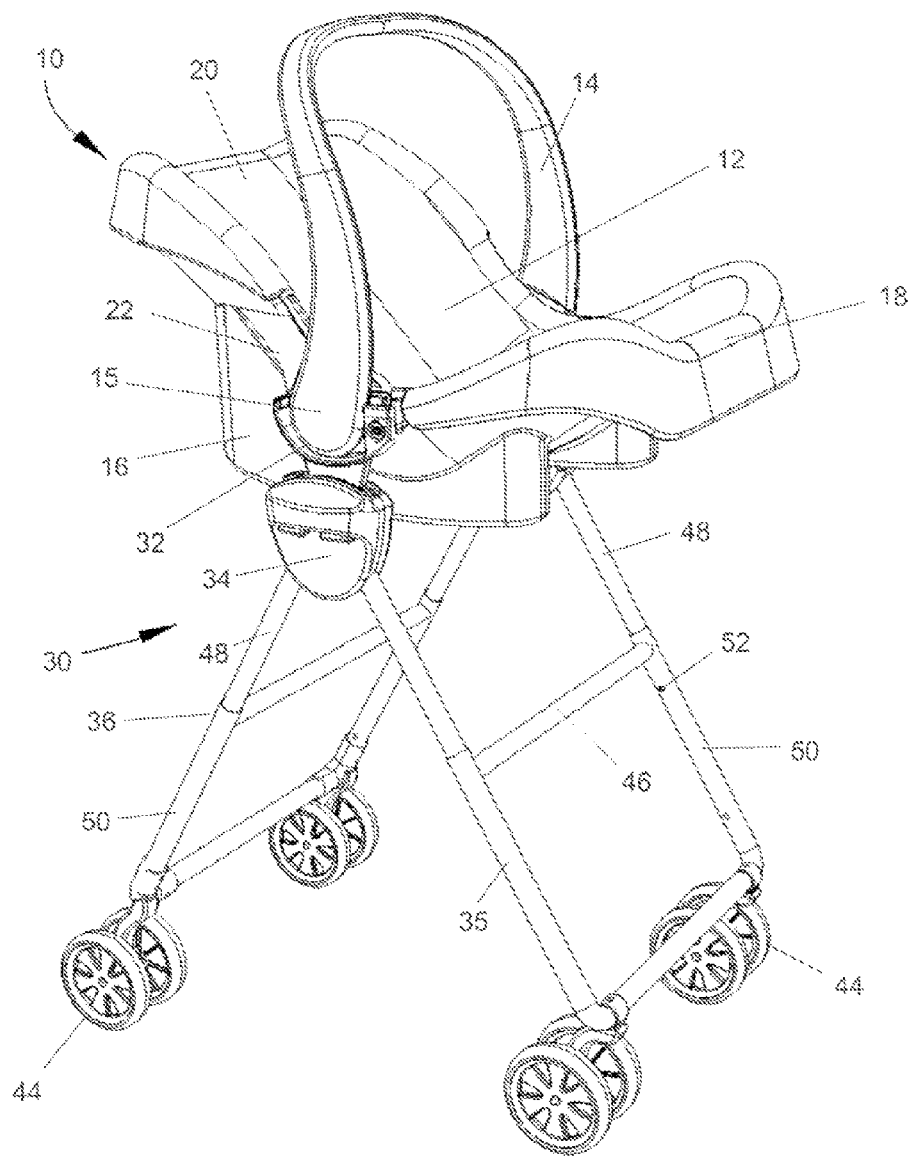
FIGS. 1-3 are front perspective, back perspective, and side views representing a car seat secured to a car seat assembly in accordance with an aspect of the present invention.
Figure 2:
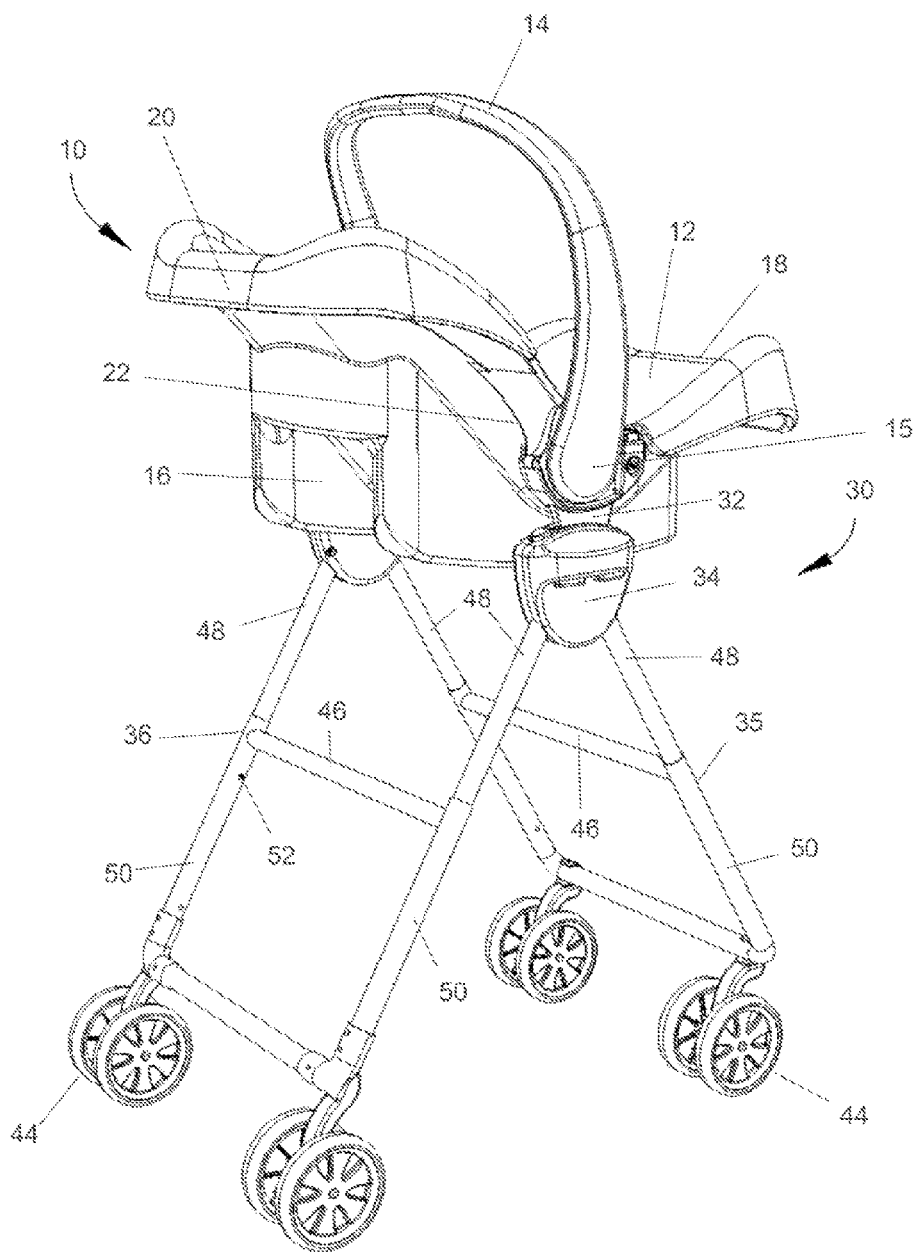
Figure 3:
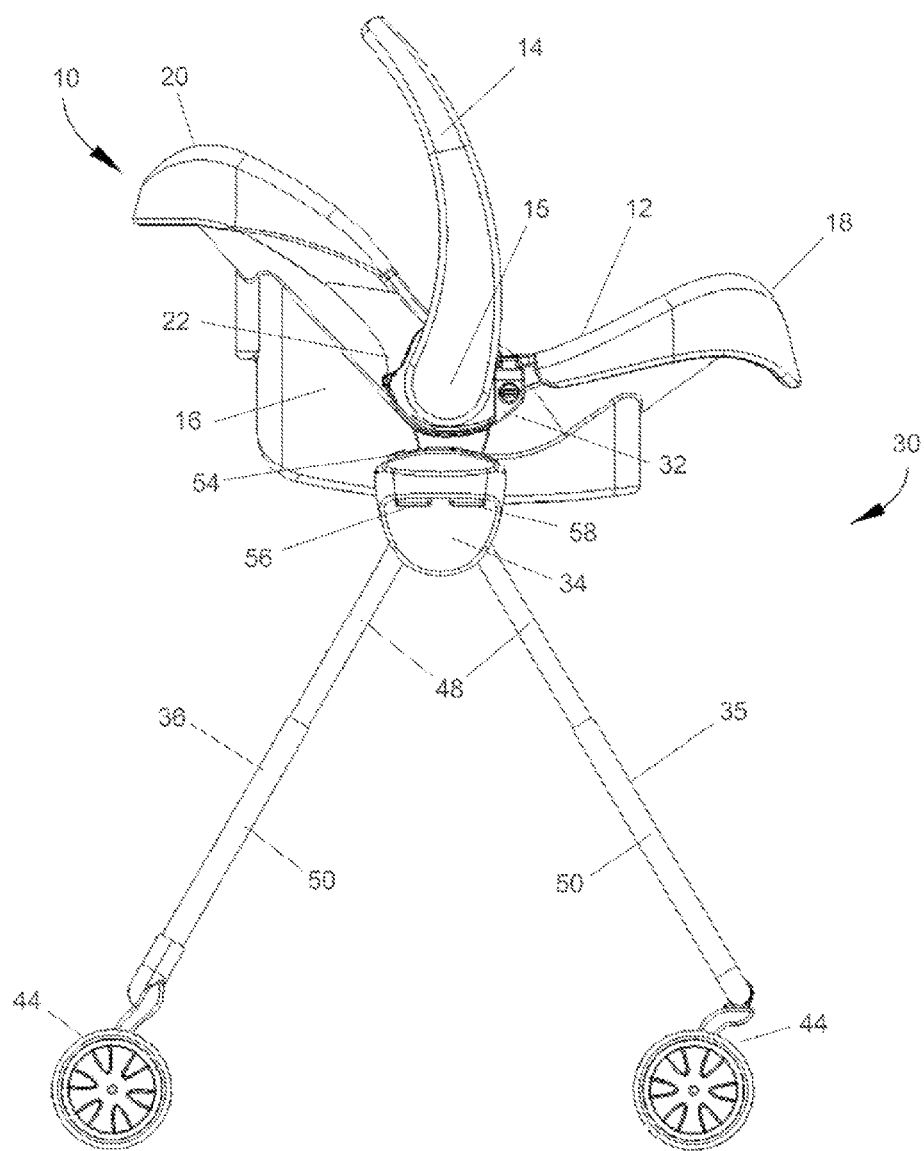

FIGS. 1-3 represent an infant car seat assembly 30 secured to a representative car seat 10 in accordance with an aspect of the present invention. The assembly 30 is intended to be a simple device which can be either added on to an infant car seat, or built into and manufactured with an infant car seat. Generally, the apparatus will allow an infant car seat to function as an infant stroller. The assembly 30 may be used with any type car seat known in the art. The car seat 30 is represented as comprising a seat 12 on a base 16 including a rotating handle 14 rotatably secured to the car seat 10 at end portions 15 of the handle 14. To facilitate the description of the car seat frame assembly 30 provided below, the terms "vertical," "horizontal," "lateral," "front," "rear," "side," "forward," "rearward," "upper," "lower," "above," "below," "right," "left," etc., will be used in reference to the perspective of an infant seated in an attached car seat, wherein "front" refers to a leg rest end 18 of the car seat 10 and "rear" refers to a head rest end 20 of the car seat 10, and therefore are relative terms that indicate the construction, installation and use of the invention and therefore help to define the scope of the invention.

Figure 4:
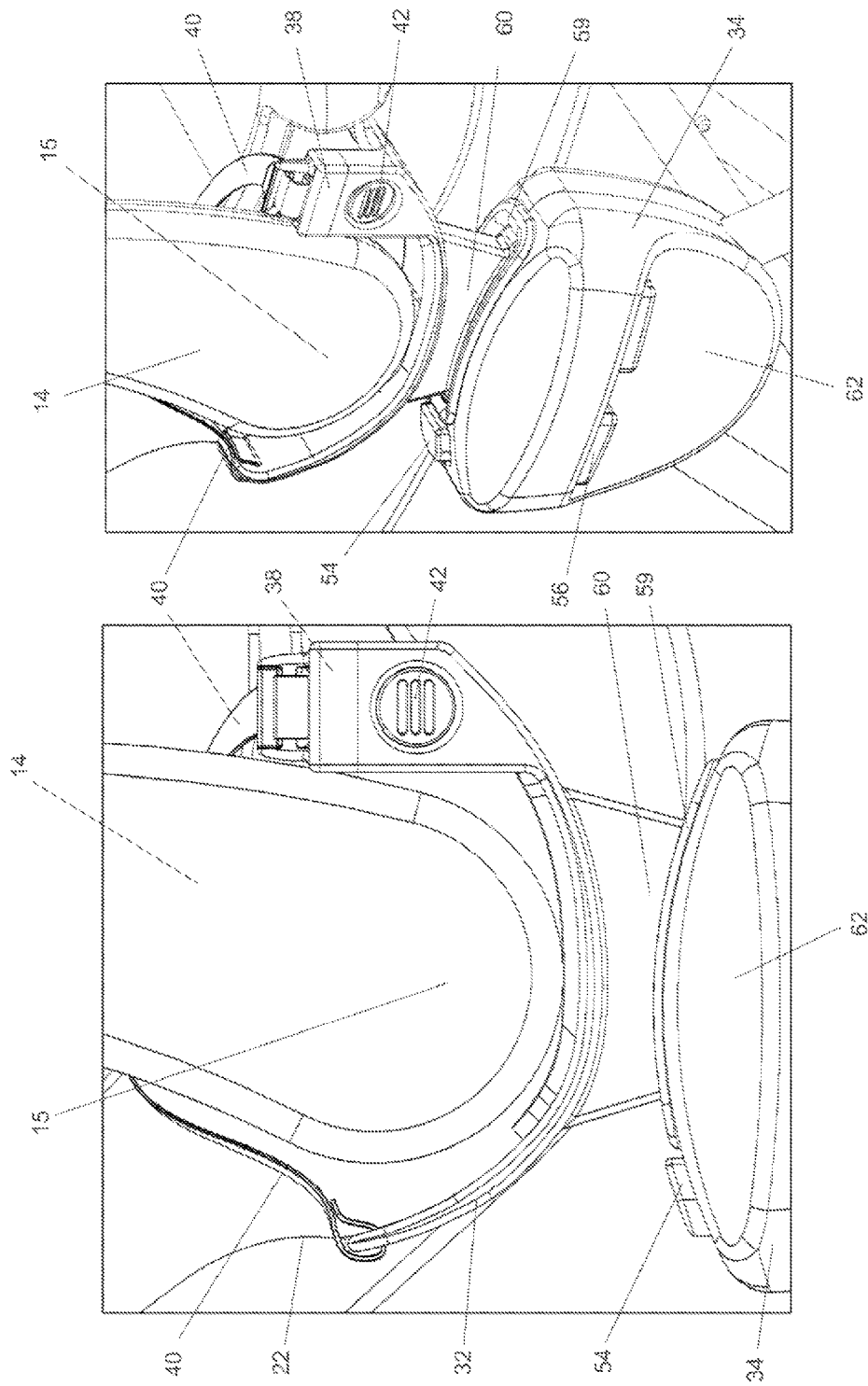
FIG. 4 represents side and perspective views of an adapter securing a hub of a car seat assembly to a car seat assembly in accordance with an aspect of the present invention.
Figure 5:
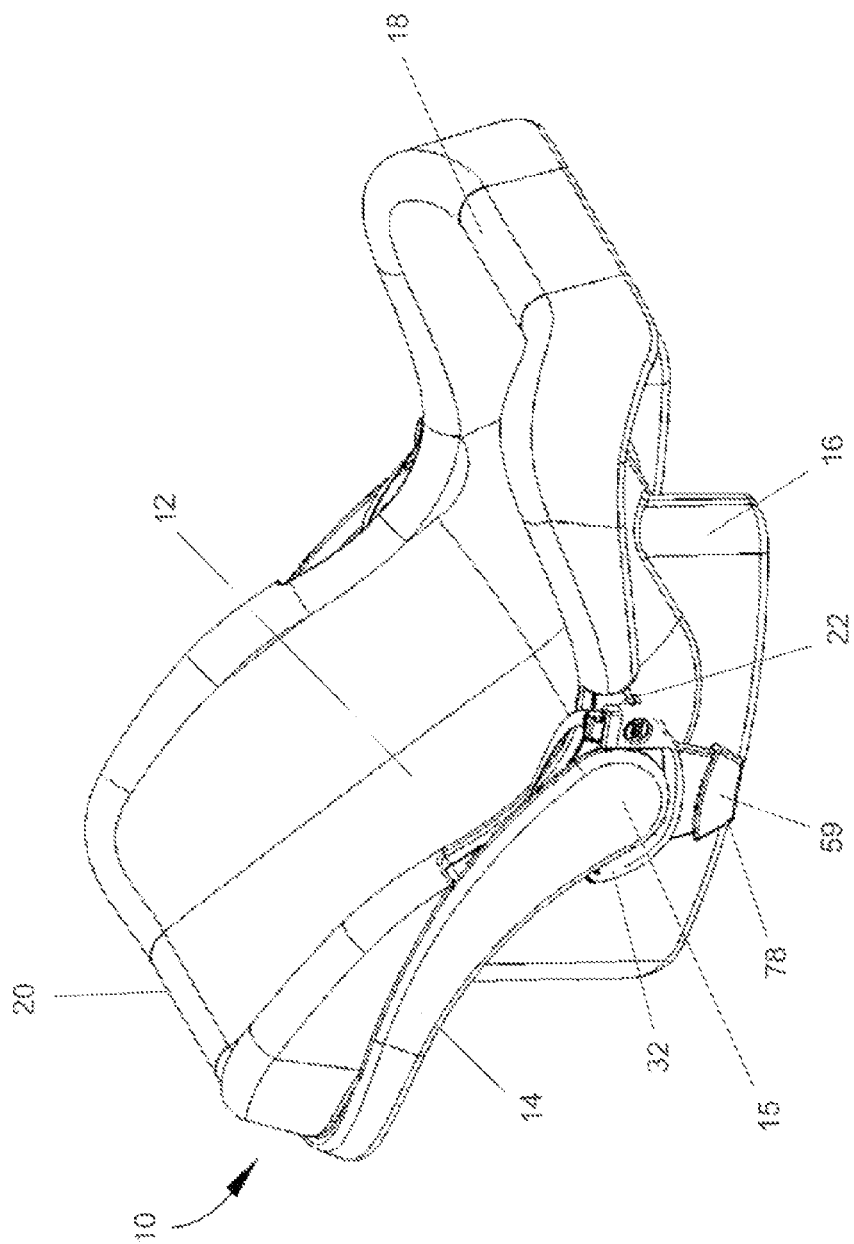
FIG. 5 is a perspective view representing a car seat secured to an adapter in accordance with an aspect of the present invention.
Figure 6:
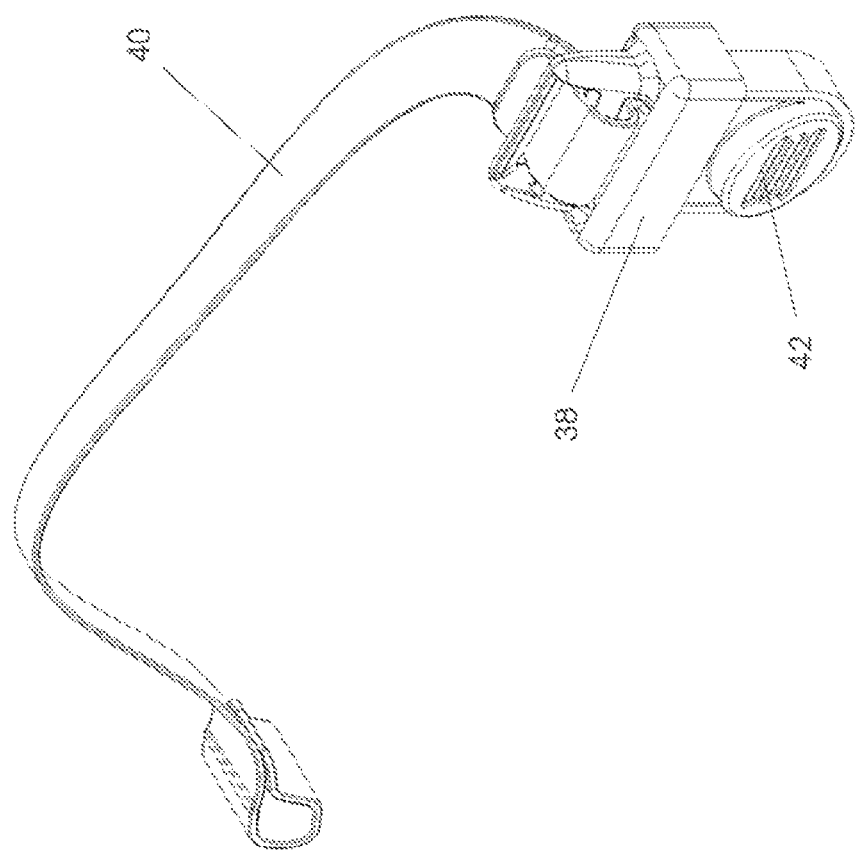
FIG. 6 is a perspective view representing a strap and a clip of the adapter of FIG. 5.

The assembly 30 comprises two hubs 34 and a pair of front legs 35 and a pair of rear legs 36 each secured to the hubs 34 at uppermost extents of each of the front and rear legs 35 and 36. The pair of front legs 35 and the pair of rear legs 36 each include at least two wheel assemblies 44 located at or adjacent lowermost extents of the front and rear legs 35 and 36. Two adapters 32 adapted to mate with the hubs 34 are utilized to releaseably secure the assembly 30 to the car seat 10. Each of the adapters 32 may be releaseably or permanently secured to the car seat 10 by any means known in the art. The adapters 32 are represented as partially encasing and securing to an edge 22 of the car seat 10 at a region below or adjacent to a lowermost extent (end portions 15) of the handle 14. Referring to FIG. 4, each adapter 32 includes a strap 40 secured to the adapters 32 on a first side of the handle 14 near the lowermost extent thereof. The strap 40 wraps around an interior side of the handle 14, and is releasably secured to the adapter 32 with a clip 38 on a second side of the handle 14. The clip 38 includes a button 42 for releasing the strap 40 from the second side of the adapter 32. The adapter 32 includes a male mating portion 60, represented in FIG. 5, sized and configured to releaseably mate with a corresponding female mating portion 59 located on the hubs 34. Although the coupling of the adapters 32 and the hubs 34 are represented as previously described, any means of coupling the adapters 32 and hubs 34 known in the art may be utilized and therefore, the present invention should not be limited to the coupling means described herein and represented in the figures.

Figure 13A:
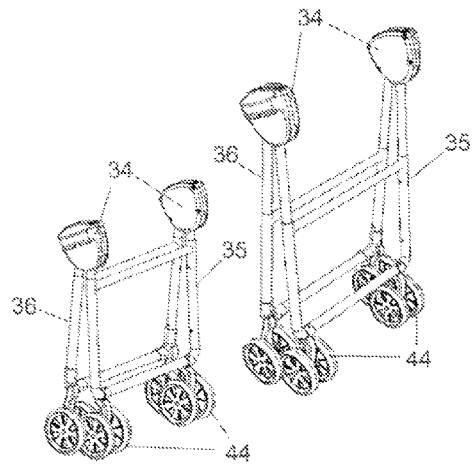
FIGS. 13A-13C represent steps carried out for assembling the car seat assembly and car seat of FIGS. 1-3.
Figure 13B:
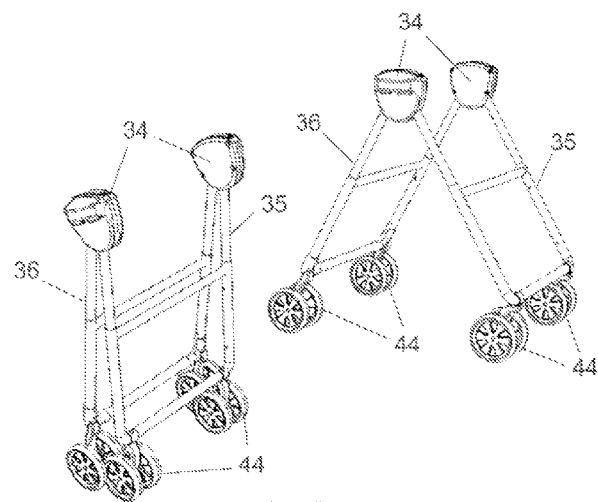
Figure 13C:
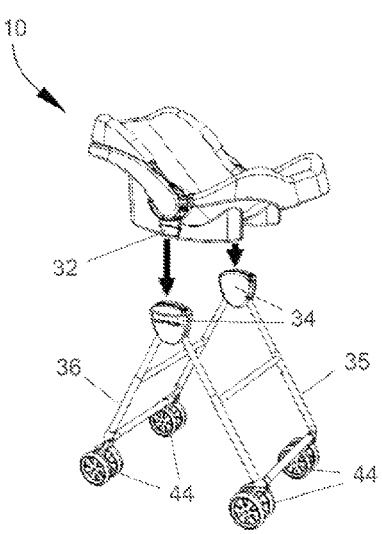

Preferably, the front and rear legs 35 and 36 are adapted to collapse and expand by rotating or pivoting at least one of the front or rear legs 35 and 36 about an axis between the uppermost extents of the front or rear legs 35 and 36 as represented in FIGS. 13A-13C. This configuration provides the assembly 30 with the capability to be in at least either a first position and a second position. The first position having the lowermost extents of the pair of front legs 35 at a minimum distance from the lowermost extents of the pair of rear legs 36 (collapsed) and the second position having the lowermost extents of the pair of front legs 35 at a maximum distance from the lowermost extents of the pair of rear legs 36 (expanded). The front and rear legs 35 and 36 are represented as expanded and collapsed in FIG. 13A. When deployed, the leg assemblies extend below the car seat, allowing the car seat to function as a stroller. The front and rear legs 35 and 36 may be formed in any configuration known in the art that provides the car seat 10 and the assembly 30 to be in an upright and stable position when the front and rear legs 35 and 36 are in an expanded position. For example, FIGS. 1-3, and 7 represent the front legs 35 and the rear legs 36 as each being formed of two upper leg portions 48 and a single U-shaped lower leg portion 50 including a crossbar 46 connecting upper ends of the U-shaped lower leg portion 50.

Figure 7:
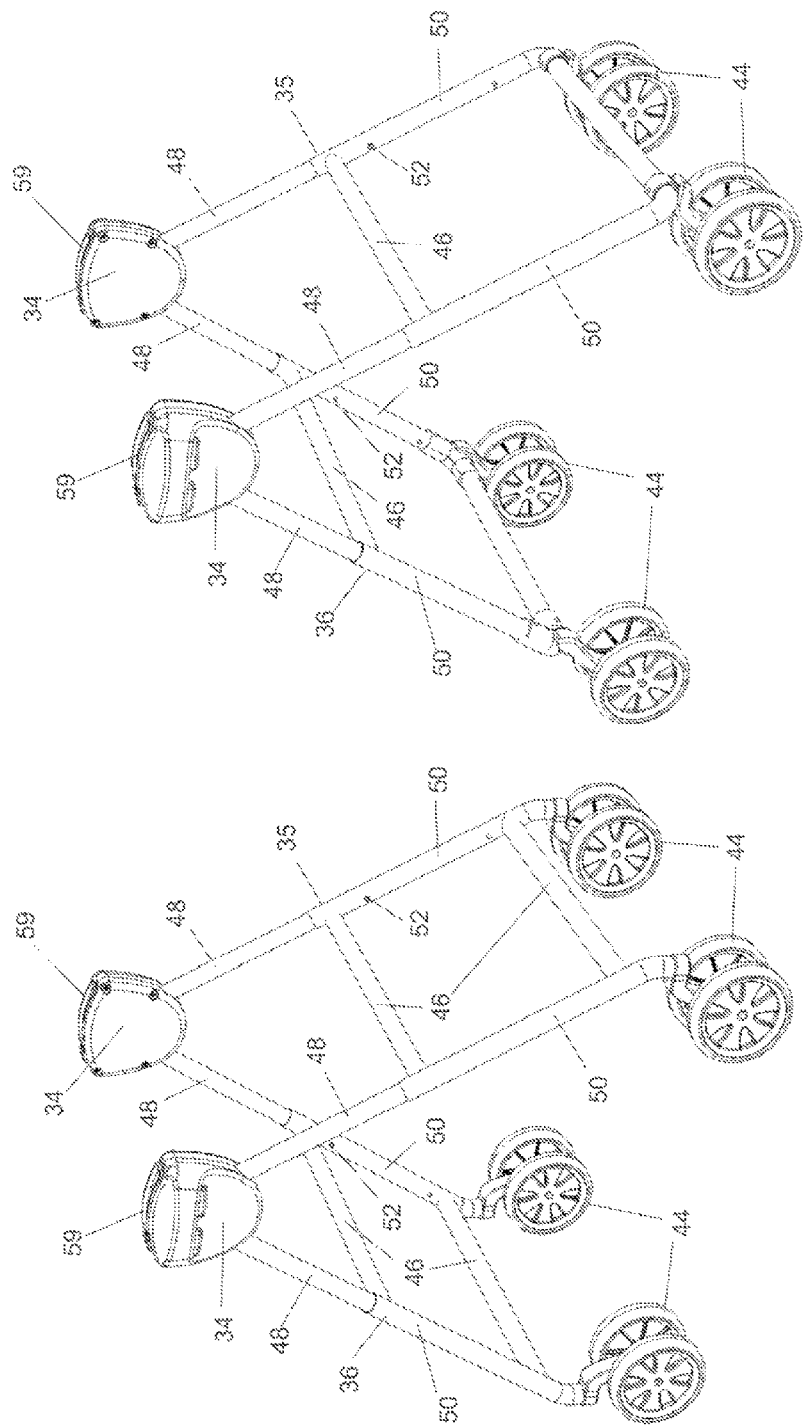
FIG. 7 includes perspective views representing various embodiments of legs of a car seat assembly in accordance with an aspect of the present invention.
Figure 9:
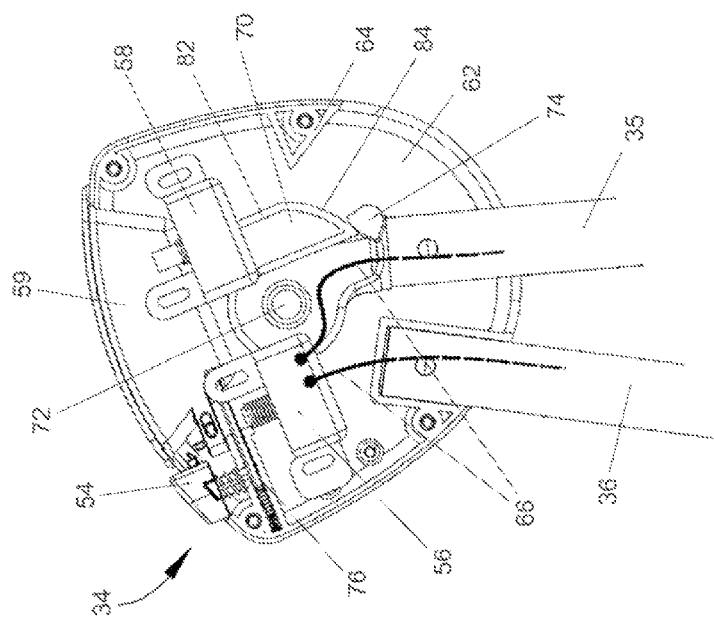

The front legs 35 and the rear legs 36 preferably telescope providing adjustment of the elevation of the car seat 10 above ground level. Therefore, the upper portions 48 are represented as being sized and configured to be inserted into the lower leg portion 50 providing the capability for retracting the upper leg portions 48 within the lower leg portions 50. The relative retracted position of the upper leg portions 48 within the lower leg portions 50 may be secured with pins 52 sized to protrude through holes formed along vertical portions of the low leg portions 49. Stated another way, the pair of front legs 35 and the pair of rear legs 36 are configured to retract to a minimum length and to expand to a maximum length and the length of the pair of front legs 35 and the pair of rear legs 36 are configured to be lockable at least at the maximum length. An alternative embodiment of the front and rear legs 35 and 36 is represented in FIG. 7 wherein the lower leg portions 50 are formed in an H-shape comprising two vertical portions and two crossbars 46 rather than the previously described U-shape. Wheel assemblies 44 are positioned adjacent at lower most and preferably outermost extents of the lower leg portions 50 to provide stable mobility and allow the car seat 10 and assembly 30 to function as a stroller.

As previously stated, the hubs 34 of the assembly 30 are adapted to secure and position front and rear legs 35 and 36 and further adapted to be secured to the car seat 10 with the adapters 32. The hubs 34 include the previously described female mating portion 60, means for locking and releasing the male mating portion 59 of the adapter 32, means for rotating and securing at least one of the front legs 35 and rear legs 36, and means for controlling the retraction and extension of the front legs 35 and rear legs 36, all within a housing 62.

According to a preferred embodiment of the present invention, the hubs 34 are represented in FIGS. 8-11 as comprising an adapter release button 54, a telescope release button 56, and a leg lock release button 58. Upon insertion of the male mating portion 60 of the adapter 32 into the female mating portion 59 of the hub 34, the male mating portion 60 preferably is locked or secured with a tab, bar and/or locking pin 76 that is inserted into a cavity 78 (represented in FIG. 5) formed on the male mating portion 59 of the adapter 32. The locking pin 76 is preferably beveled to allow the male mating portion 60 to be inserted without pressing the adapter release button 54. By pressing the adapter release button 54 downward, the locking pin 76 is preferably forced from the cavity 78 releasing the male mating portion 60.

Figure 12:
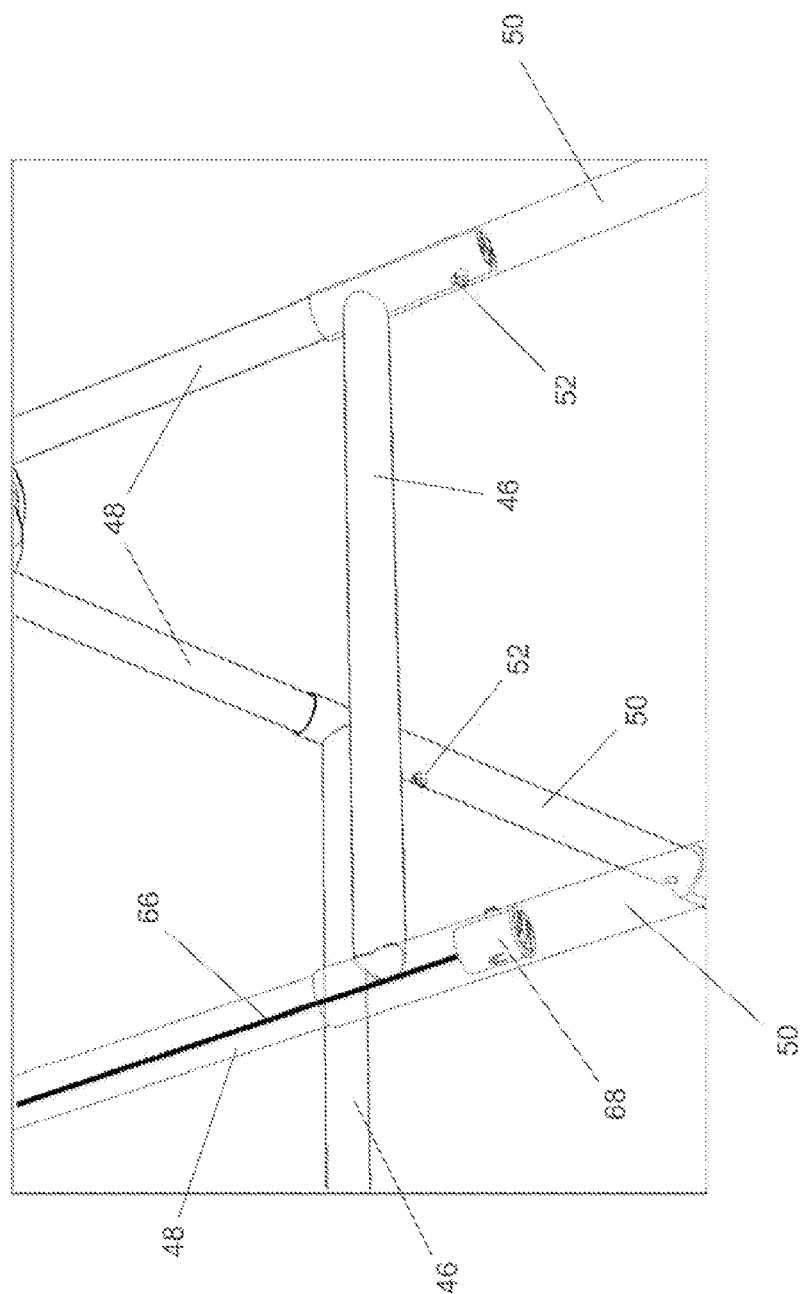
FIG. 12 is a perspective view with partial cutaways showing interior portions of the legs of the car seat assembly of FIGS. 1-3.

The telescope release button 56 is connected to wires 66 that couple the telescope release button 56 with internal leg height lock mechanisms 68 (represented in FIG. 12) comprising the pins 52. By pressing the telescope release button 56 upward, the wires 66 act upon the lock mechanisms 68 to retract the pins 52 into an internal cavity of the lower leg portions 50 allowing the upper leg portions 48 to retract within the lower leg portions 50.

Figure 8:
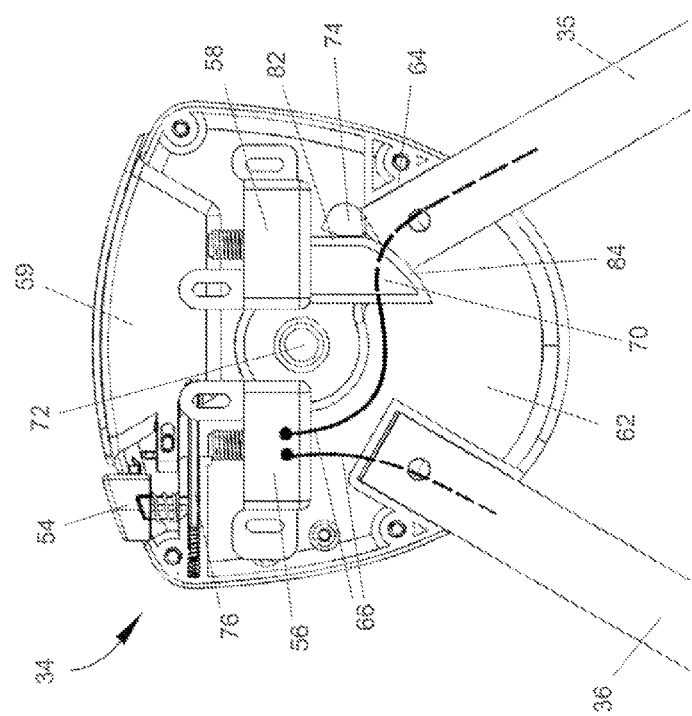

The leg lock release button 58 includes a rotation locking member 70 having a vertical portion 82 and a curved portion 84. The front legs 35 are adapted to pivot about an axis of an axle member 72 to switch between an expanded position and a collapsed position. In the expanded position, a locking nub 74 secured to the axle member 72 is secured between the vertical portion 82 of the locking member 70 and a brace 64 of the housing 62 thereby locking and securing the position of the front legs 35, as represented in FIG. 8. By pressing the leg lock release button 58 upwards, the locking nub 74 is released and rotatably slides along the curved portion 84 of the locking member 70 until meeting the rear legs 36 in the a locked collapsed position, represented in FIG. 10.

In operation, the adapters 32 are preferably kept attached to the car seat 10 with the straps 40 to provide easy transition between car seat and stroller functions. To transition to function as a stroller, the telescope release button 56 may be pressed to extend the telescoping front and rear legs 35 and 36 as represented in FIG. 13A. The leg lock release button 58 may then be pressed to pivot and reposition the front and rear legs 35 and 36 from the collapsed position to the locked expanded position, as represented in FIG. 13B. The car seat 10 may then be lowered onto the assembly 30 securing the adapters 32 into the hubs 34, as represented in FIG. 13C. The weight of the car seat 10 rests on the adapters 32 and is supported by the assembly 30. One may then operate the car seat 10 and assembly 30 as a stroller by pushing on the handle 14 of the car seat 10. To transition to function as a car seat, the adapter release button 54 is pushed to release the car seat 10 from the hub 34 and the car seat 10 with the attached adapters 32 may be placed in the vehicle. The telescope release button 56 and the leg lock release button 58 may be pressed to retract the telescoping front and rear legs 35 and 36 and pivot and reposition the front and rear legs 35 and 36 from the extended and expanded position to the retracted and collapsed position for storage in the vehicle.

Figure 14:
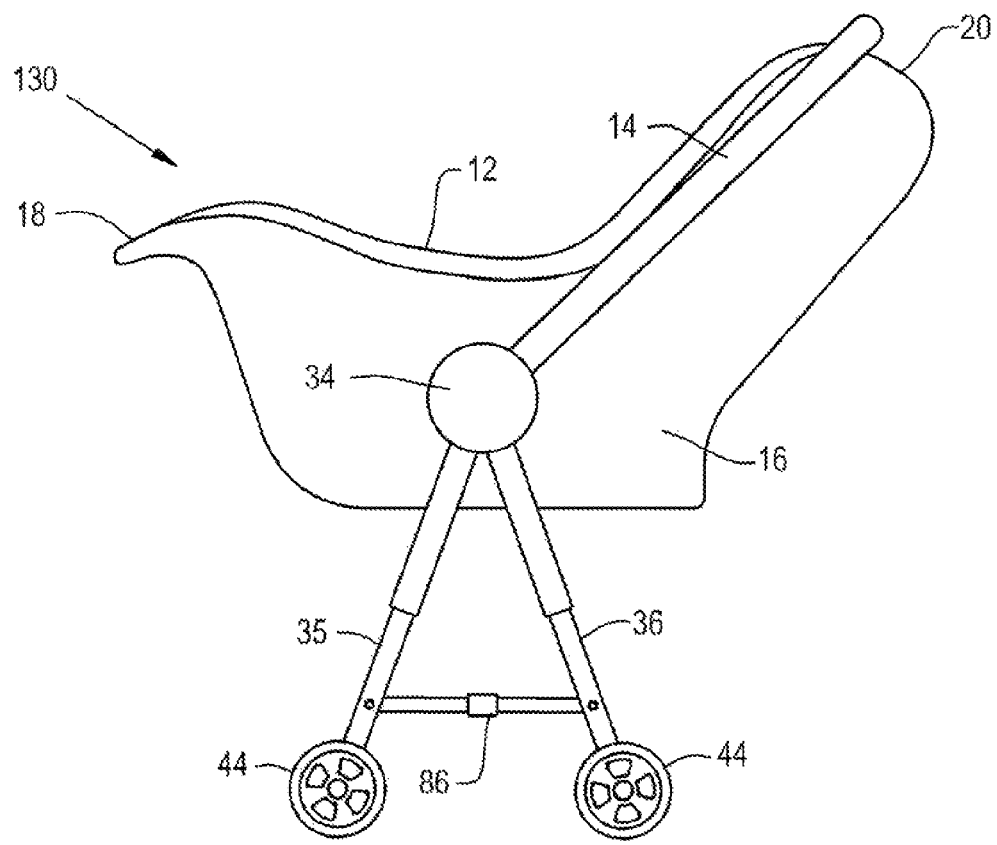
FIGS. 14 and 15 are side views representing a car seat secured to a car seat assembly in accordance with an aspect of the present invention.
Figure 15:
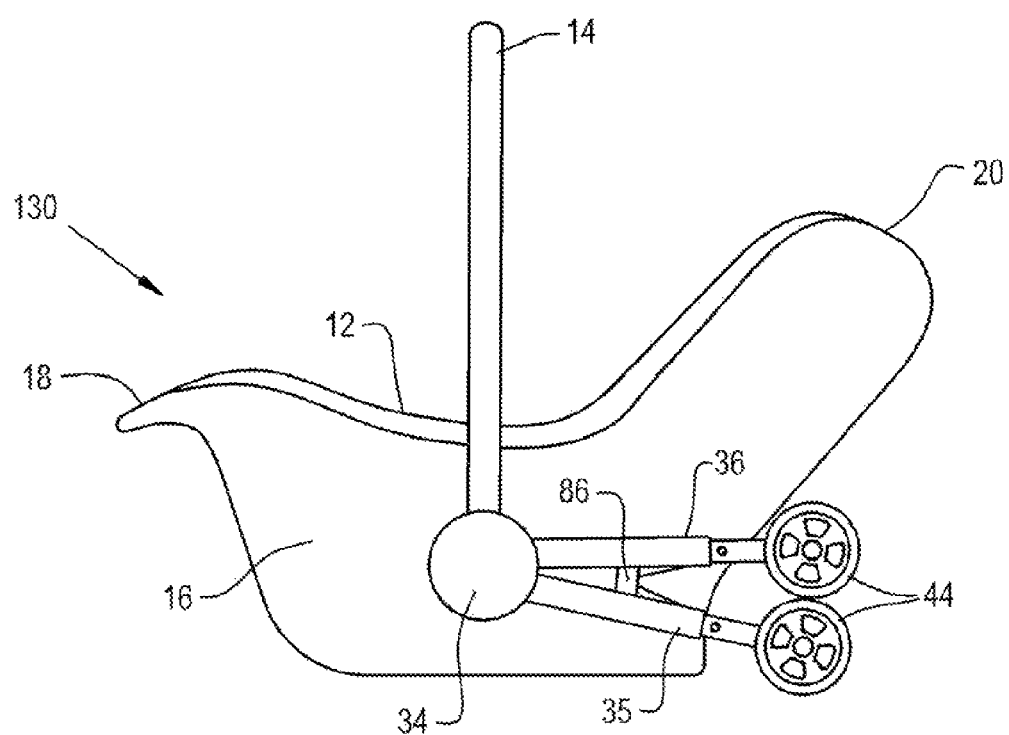

FIGS. 14 and 15 represent a second embodiment of the present invention. As represented, the car seat frame assembly 130 comprise substantially similar components to the embodiment of FIGS. 1-13 including the hub 34, front legs 35, rear legs 36, and wheel assemblies 44. The assembly 130 is adapted to allow the car seat to be inserted into the vehicle and utilized as the car seat 10 without removing the assembly 130 from the car seat 10. Consequently, the adapters 32 are an optional feature of this embodiment. If the adapters 32 are omitted, the hubs 34 may be adapted to be releaseably or permanently secured to the car seat 10 by any known means including those described for the adapters 32 in FIGS. 1-13. In addition, the assembly 130 is represented in FIG. 14 as comprising an optional collapsible bar 86 further supporting the assembly 130 by connecting the front legs 35 to the rear legs 36.

In contrast to the embodiments of FIGS. 1-13, both the front legs 35 and the rear legs 36 of the assembly 130 are adapted to pivot in unison within the hub 34 about uppermost extents of the front legs 35 and the rear legs 36, respectively. Preferably, the leg lock release button 58 is adapted to simultaneously release both the front legs 35 and the rear legs 36 allowing them to pivot in unison. Preferably, the front and rear legs 35 and 36 may be positioned in either an expanded position with the front and rear legs 35 and 36 extended, as represented in FIG. 14 and similar to that of FIGS. 1-3, or a collapsed position with the front and rear legs 35 and 36 retracted as represented in FIG. 15. By positioning the assembly 130 in a locked and collapsed position above the lowermost extent of the base 16 of the car seat 10, the car seat 10 may be used for its intended purpose in a vehicle without requiring the removal of the assembly 130. In operation, the assembly 130 performs in a substantially similar manner as described above for assembly 30, but without the steps of securing and/or releasing the assembly 130 when switching between car seat and stroller functions.

While the invention has been described in terms of specific embodiments, it is apparent that other forms could be adopted by one skilled in the art. For example, the physical configuration of the front and rear legs 35 and 36, adapter 32, and hub 34 could differ from that shown. Therefore, the scope of the invention is to be limited only by the following claims.

The invention claimed is:

1. An infant car seat assembly for providing mobility to an infant car seat, the infant car seat assembly comprising:
   at least two hubs;
   a pair of front legs secured to the hubs at uppermost extents thereof and having at least two wheel assemblies secured to lowermost extents thereof;
   a pair of rear legs secured to the hubs at uppermost extents thereof and having at least two wheel assemblies secured to lowermost extents thereof; and
   at least two adapters configured to releaseably secure to the infant car seat and to releaseably secure to the hubs thereby releaseably securing the hubs to the infant car seat.

2. The infant car seat assembly of claim 1, wherein the infant car seat comprises a handle and the adapters are configured to secure to an edge of the infant car seat adjacent lowermost extents of the handle.

3. The infant car seat assembly of claim 2, wherein the adapters each comprise a strap secured to the adapter on a first side of the handle near the lowermost extent thereof and releaseably secured to the adapter on a second side of the handle, wherein the strap is configured to wrap around an interior side of the handle.

4. The infant car seat assembly of claim 1, wherein the pair of front legs are adapted to pivot about an axis between the uppermost extents thereof, wherein the infant car seat assembly includes at least a first position and a second position, the first position locating the lowermost extents of the pair of front legs at a minimum distance from the lowermost extents of the pair of rear legs, the second position locating the lowermost extents of the pair of front legs at a maximum distance from the lowermost extents of the pair of rear legs.

5. The infant car seat assembly of claim 1, wherein the hubs each comprise an adapter release button configured to release the adapters from the hubs.

6. The infant car seat assembly of claim 4, wherein the pair of rear legs are adapted to pivot about an axis between the uppermost extents thereof, wherein the first pair of legs and the second pair of legs are located above a lowermost extent of a base of the infant car seat when in the second position.

7. The infant car seat assembly of claim 1, wherein the pair of front legs and the pair of rear legs are configured to retract to a minimum length and to expand to a maximum length, wherein the length of the pair of front legs and the pair of rear legs are configured to be lockable at least at the maximum length.

8. The infant car seat assembly of claim 7, wherein the hubs each comprise a telescope release button configured to unlock the pair of front legs and the pair of rear legs.

9. An infant car seat assembly for providing mobility to an infant car seat, the infant car seat assembly comprising:
   at least two hubs;
   a pair of front legs secured to the hubs at uppermost extents thereof and having at least two wheel assemblies secured to lowermost extents thereof;
   a pair of rear legs secured to the hubs at uppermost extents thereof and having at least two wheel assemblies secured to lowermost extents thereof,
   at least two adapters configured to releaseably secure the hubs to the infant car seat,
   wherein the infant car seat comprises a handle and the adapters are configured to releaseably secure to an edge of the infant car seat adjacent lowermost extents of the handle, the adapters each comprising a strap secured to the adapter on a first side of the handle near the lowermost extent thereof and releaseably secured to the adapter on a second side of the handle, wherein the strap is configured to wrap around an interior side of the handle thereby releaseably securing the adapters and the hubs to the infant car seat.

10. The infant car seat assembly of claim 9, wherein the adapters are configured to releaseably secure to the hubs.

11. The infant car seat assembly of claim 9, wherein the infant car seat can function in a vehicle without detaching the infant car seat assembly from the infant car seat.

12. An infant car seat assembly for providing mobility to an infant car seat, the infant car seat assembly comprising:
   at least two hubs permanently fixed to the infant car seat;
   a pair of front legs secured to the hubs at uppermost extents thereof and having at least two wheel assemblies secured to lowermost extents thereof;
   a pair of rear legs secured to the hubs at uppermost extents thereof and having at least two wheel assemblies secured to lowermost extents thereof, wherein the infant car seat assembly is adapted to secure to the infant car seat and the infant car seat can function in a vehicle without detaching the infant car seat assembly from the infant car seat, wherein both the pair of front legs and the pair of rear legs are adapted to pivot about an axis between the uppermost extents thereof, wherein the infant car seat assembly includes at least a first position and a second position, the first position locating the lowermost extents of the pair of front legs at a minimum distance from the lowermost extents of the pair of rear legs, the second position locating the lowermost extents of the pair of front legs at a maximum distance from the lowermost extents of the pair of rear legs, wherein the first pair of legs and the second pair of legs are located above a bottom of a base of the infant car seat and both pivoted towards the same end of the infant car seat when in the first position.

13. The infant car seat assembly of claim 12, wherein the pair of front legs and the pair of rear legs are configured to retract to a minimum length and to expand to a maximum length, wherein the length of the pair of front legs and the pair of rear legs are configured to be lockable at least at the maximum length.

14. The infant car seat assembly of claim 13, wherein the hubs each comprise a telescope release button configured to unlock the pair of front legs and the pair of rear legs.

15. The infant car seat assembly of claim 9, wherein the hubs each comprise an adapter release button configured to release the adapters from the hubs.

16. The infant car seat assembly of claim 9, wherein both the pair of front legs and the pair of rear legs are adapted to pivot about an axis between the uppermost extents thereof, wherein the infant car seat assembly includes at least a first position and a second position, the first position locating the lowermost extents of the pair of front legs at a minimum distance from the lowermost extents of the pair of rear legs, the second position locating the lowermost extents of the pair of front legs at a maximum distance from the lowermost extents of the pair of rear legs, wherein the first pair of legs and the second pair of legs are located above a bottom of a base of the infant car seat when in the second position.

17. The infant car seat assembly of claim 9, wherein the pair of front legs and the pair of rear legs are configured to retract to a minimum length and to expand to a maximum length, wherein the length of the pair of front legs and the pair of rear legs are configured to be lockable at least at the maximum length.

18. The infant car seat assembly of claim 17, wherein the hubs each comprise a telescope release button configured to unlock the pair of front legs and the pair of rear legs.

\* \* \* \* \*